(12) United States Patent
Popp et al.

(10) Patent No.: US 6,539,814 B1
(45) Date of Patent: Apr. 1, 2003

(54) FLOWMETER WITH THREADLESS BODY AND FLOAT STOPPER

(75) Inventors: Michael A. Popp, LaPorte, IN (US); Michael A. Morningstar, Valparaiso, IN (US)

(73) Assignee: Dwyer Instruments, Inc., Michigan City, IN (US)

( * ) Notice: Subject to any disclaimer, the term of this patent is extended or adjusted under 35 U.S.C. 154(b) by 0 days.

(21) Appl. No.: 10/044,754

(22) Filed: Oct. 23, 2001

(51) Int. Cl.[7] .................................................. G01F 1/24
(52) U.S. Cl. ..................................................... 73/861.56
(58) Field of Search ......................... 73/861.52–861.58; 248/231.81, 228.7; 24/455–458, 467, 470, 472

(56) References Cited

U.S. PATENT DOCUMENTS 2,707,879 A * 5/1955 Dwyer ..................... 73/861.55
3,232,107 A * 2/1966 Busillo ..................... 73/861.55
3,675,481 A   7/1972 Phillips
5,402,686 A * 4/1995 Wittmann ................. 73/861.55

* cited by examiner

Primary Examiner—Max Noori
Assistant Examiner—C Dickens
(74) Attorney, Agent, or Firm—Barnes & Thornburg

(57) ABSTRACT

A flowmeter for measuring fluid flow including a body having a receptacle including a cavity formed by a threadless cylindrical side wall, a stopper adapted to be inserted into the cavity of the receptacle including a generally cylindrical threadless shank having an annular groove, and a clip member slidably located in a passage of the body. The clip member is slidable between a first position wherein the clip member is located within the annular groove of the stopper to prevent removal of the stopper from the body, and a second position wherein the clip member is located outside of the annular groove of the stopper whereby the stopper may be longitudinally removed from the receptacle of the body.

14 Claims, 4 Drawing Sheets

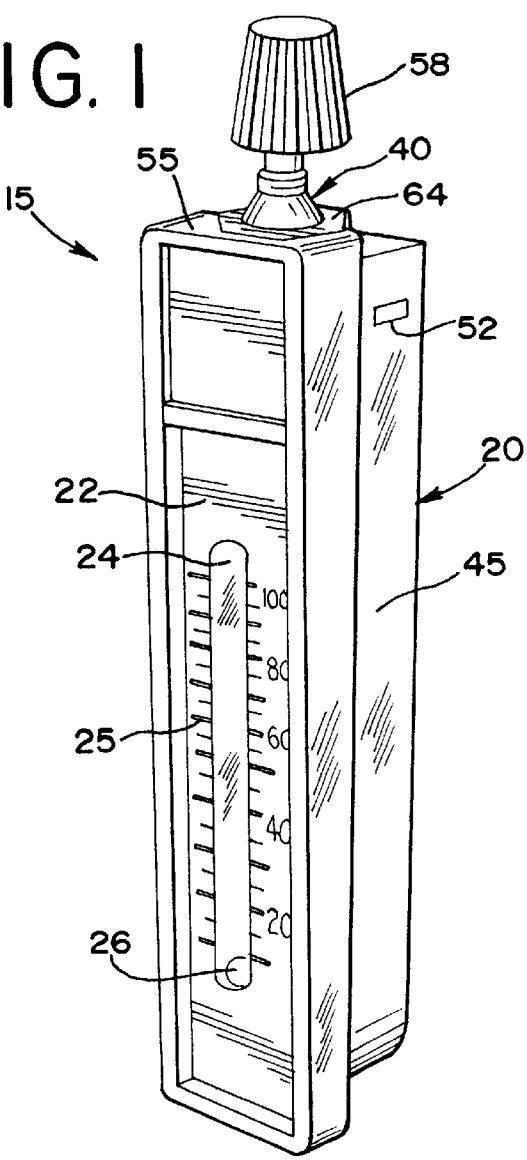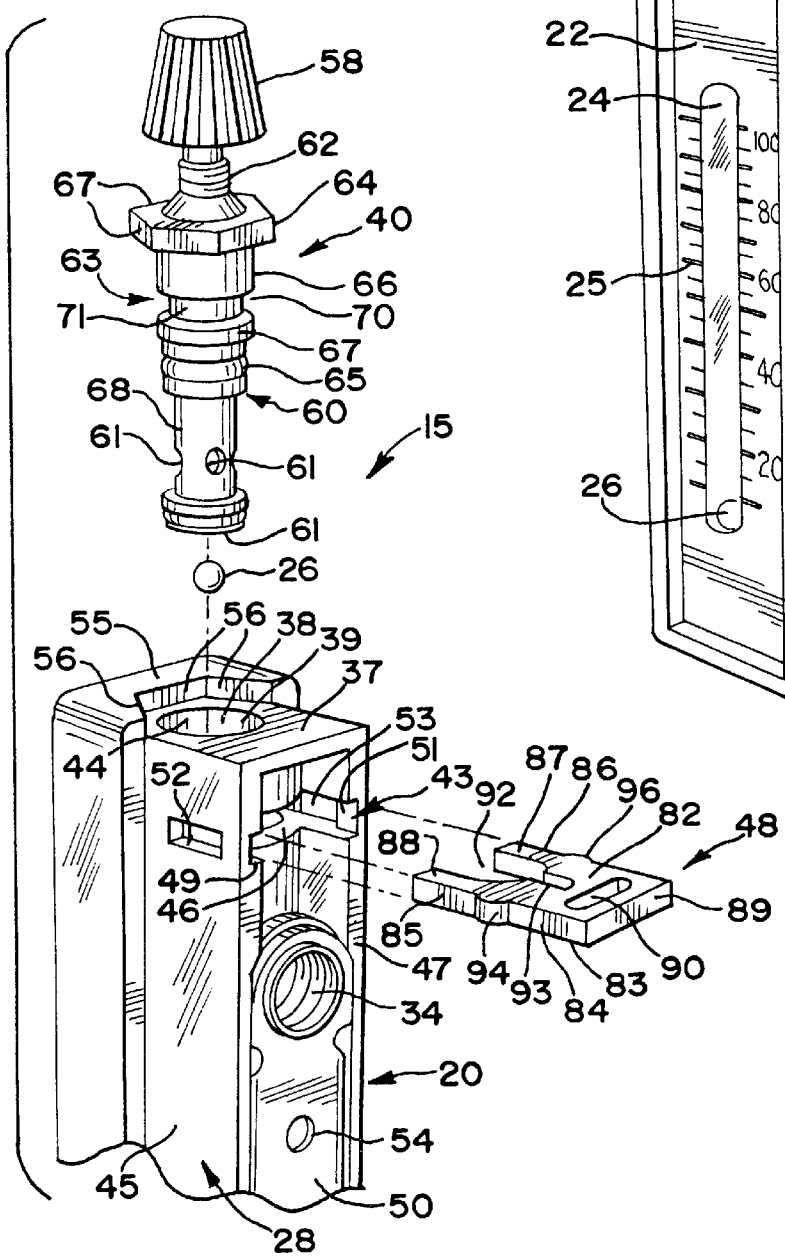

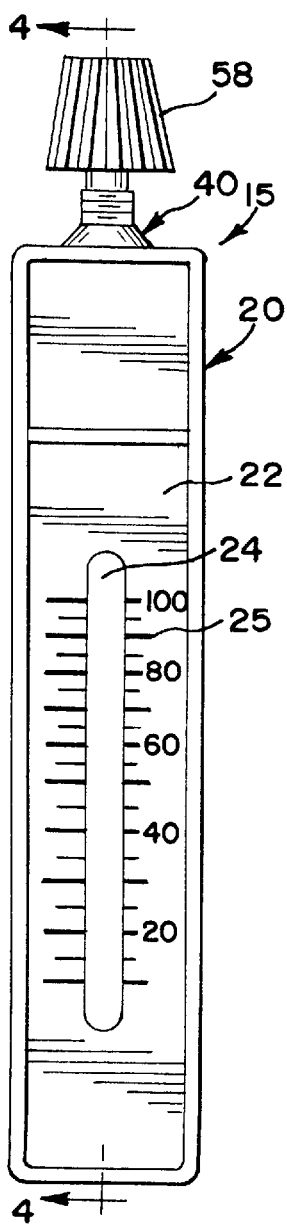
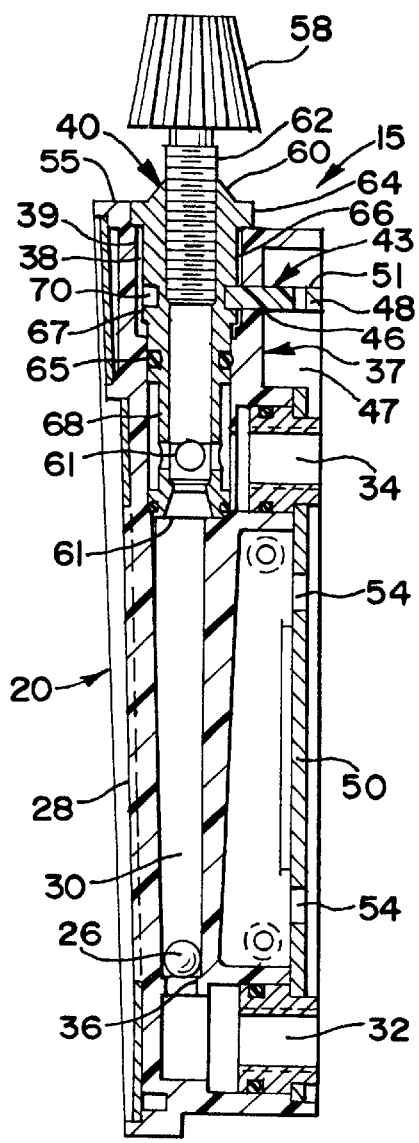

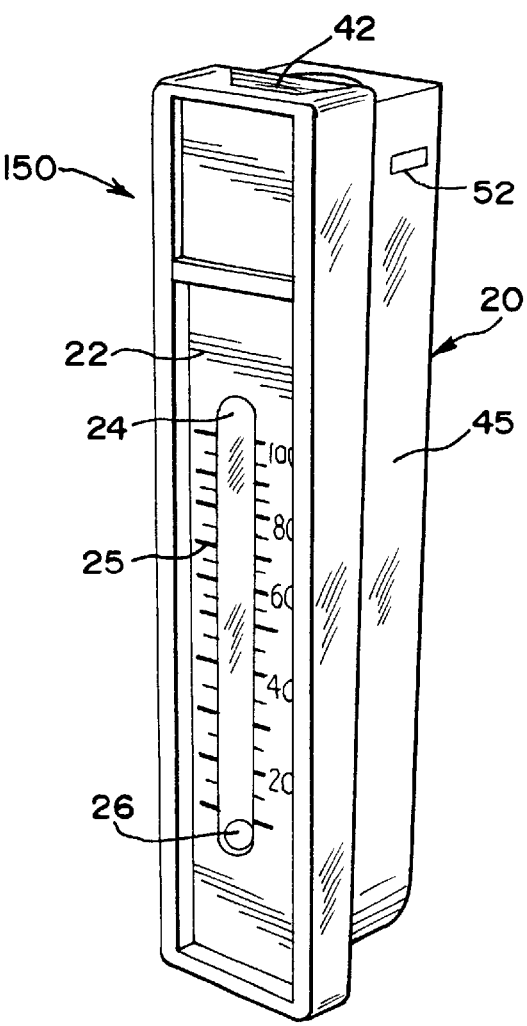
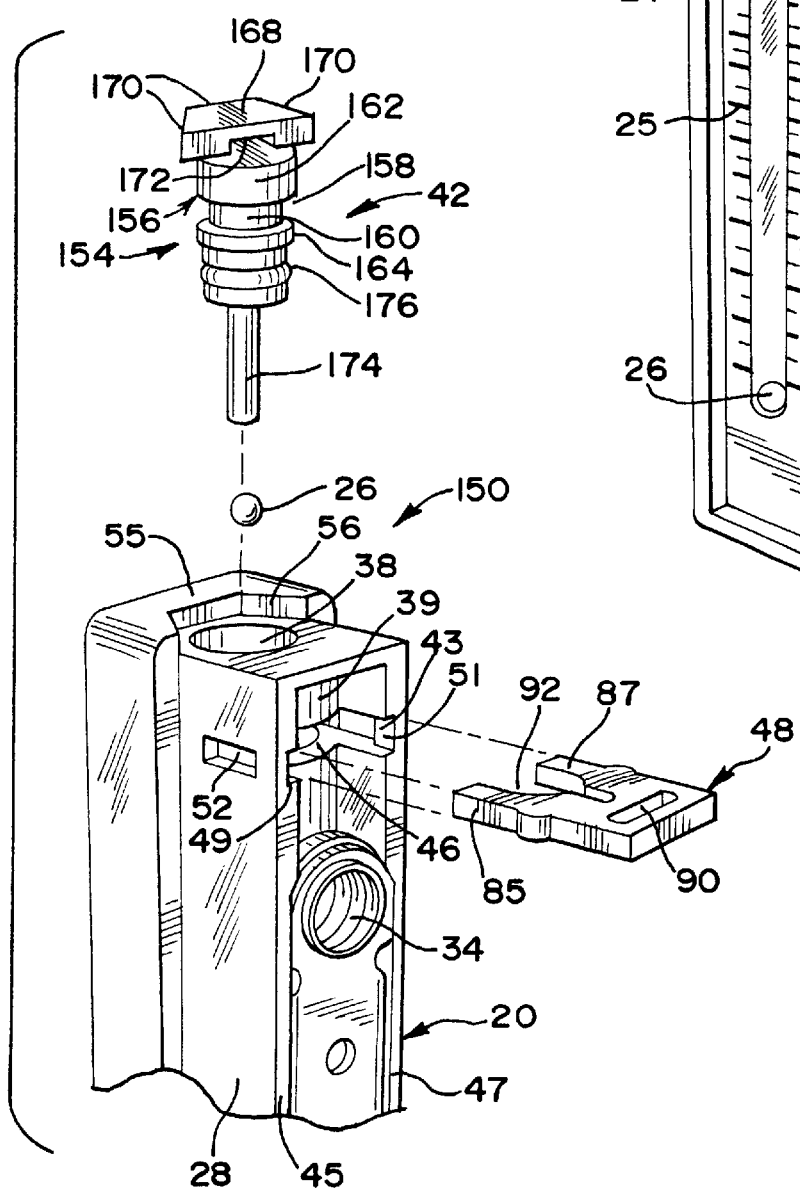

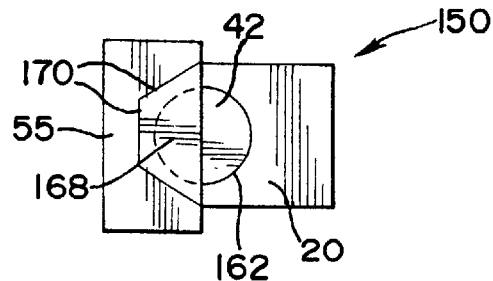
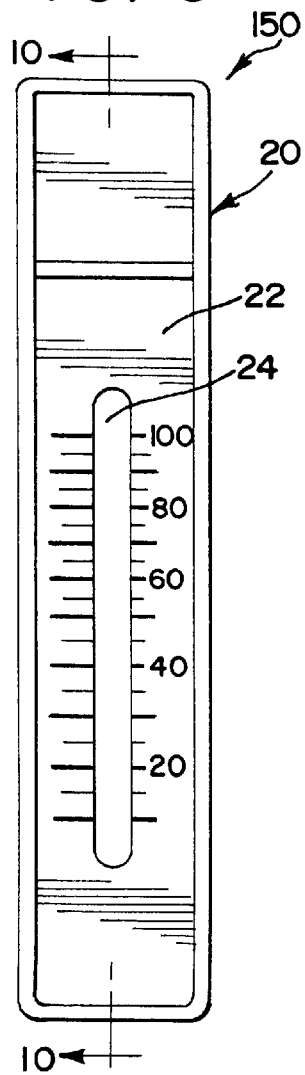
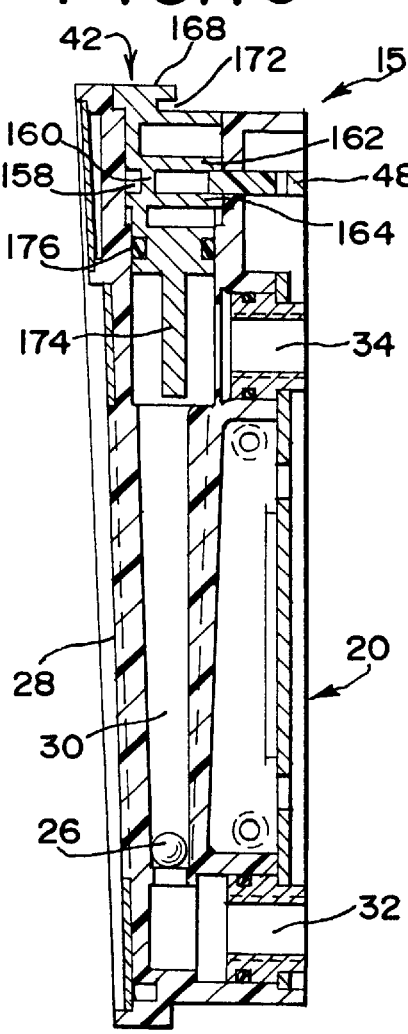
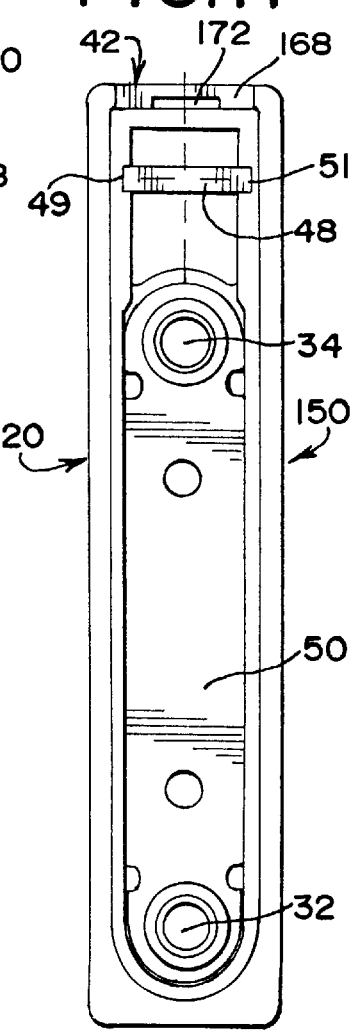

FLOWMETER WITH THREADLESS BODY AND FLOAT STOPPER

BACKGROUND OF THE INVENTION

The present invention is directed to a flowmeter, and in particular to a flowmeter having a threadless flowmeter body and a threadless float stopper removably securable to the flowmeter body by a slidable retaining clip member.

Flowmeters are instruments or devices for measuring the rate of flow of a fluid such as a gas or liquid. In normal applications, the flowmeter will periodically require disassembly to remove debris that has collected within the flowmeter, or to replace seals such as O-rings that have deteriorated. Existing flowmeters, like those described in U.S. Pat. No. 3,675,481 of the applicant Dwyer Instruments, Inc., require tools such as wrenches to disassemble the threaded parts of the flowmeter in order to provide routine maintenance. Flowmeters having threaded fittings also require additional cost to manufacture. The present invention overcomes these problems.

SUMMARY OF THE INVENTION

A flowmeter for measuring fluid flow. The flowmeter includes a flowmeter body having a fluid inlet, a fluid outlet, and a bore in fluid communication with the inlet and the outlet. The flowmeter body also includes a receptacle having a cavity formed by a threadless generally cylindrical side wall wherein the cavity is in communication with the bore. The body also includes a passage extending through the side wall in communication with the cavity. The passage includes a slot extending through the side wall of the receptacle and first and second channels formed in first and second walls of the body. Each channel includes a seat in the form of an elongate slot. The flowmeter also includes a stopper adapted to be removably inserted into the cavity of the receptacle of the body. The stopper includes a shank having an annular groove located between a threadless generally cylindrical upper surface and a threadless generally cylindrical lower surface. The groove is adapted to be in communication with the passage of the body when the stopper is inserted into the cavity of the receptacle. A clip member is slidably located in the channels of the passage of the body. The clip member includes first and second spaced apart legs and a recess located between the legs. The clip member is adapted to be slidable to a first position wherein the legs of the clip member extend into the annular groove of the stopper such that the shank of the stopper is located between the legs and in the recess of the clip member. The clip member thereby prevents removal of the stopper from the receptacle. The clip member is slidable to a second position wherein the clip member is located outside of the annular groove of the stopper whereby the stopper may be longitudinally removed from the cavity of the receptacle of the body. The first leg and second leg of the clip member each include a protrusion that is adapted to be located within the respective seats of the channels to inhibit removal of the clip member from the body while allowing sliding movement of the clip member between the first position and the second position.

BRIEF DESCRIPTION OF THE DRAWING FIGURES

FIG. 1 is a perspective view of a flowmeter of the present invention including a valve-type float stopper.

FIG. 2 is a partial exploded view of the flowmeter of FIG. 1.

FIG. 3 is a front elevational view of the flowmeter of FIG. 1.

FIG. 4 is a cross sectional view taken along line 4—4 of FIG. 3.

FIG. 5 is a rear elevational view of the flowmeter of FIG. 1.

FIG. 6 is a top plan view of the flowmeter of FIG. 1.

FIG. 7 is a partial perspective view of another embodiment of the present invention incorporating a plug-type float stopper.

FIG. 8 is a partial exploded view of the flowmeter of FIG. 7.

FIG. 9 is a front elevational view of the flowmeter of FIG. 7.

FIG. 10 is a cross sectional view taken along line 10—10 of FIG. 9.

FIG. 11 is a rear elevational view of the flowmeter of FIG. 7.

FIG. 12 is a top plan view of the flowmeter of FIG. 7.

DETAILED DESCRIPTION OF THE PREFERRED EMBODIMENTS

The flowmeter 15 of the present invention, as shown in FIGS. 1 and 2, is adapted to be attached to fluid conduits and used to measure fluid flow rates. The flowmeter 15 includes a flowmeter body 20 which is generally elongate and has a top end and a bottom end. The flowmeter body 20 includes a faceplate 22 having a window 24 and a scale 25. The window 24 and scale 25 allow the user to determine the fluid flow rate by viewing the position of a float element 26 with respect to the calibrated graduations of the scale 25.

As best shown in FIG. 4, the flowmeter body 20 includes a flow tube 28 having a tapered bore 30 that diverges upwardly, and a fluid inlet 32 and a fluid outlet 34 in communication with the bore 30 respectively at lower and upper ends of the bore 30. The bore 30 encloses the float element 26 and includes a projection 36 at the lower end of the bore 30 to prevent the float element 26 from escaping through the inlet 32 during periods of low fluid flow. The float element 26 is a spherical ball.

The flowmeter body 20 includes a threadless float-stop receptacle 37 having a cavity 38 in communication with the upper end of the bore 30. The cavity 38 is formed by a threadless generally cylindrical wall 39. The cavity 38 of the receptacle 37 is adapted to receive a threadless float stopper. The float stopper may be a valve-type float stopper 40 (as included in the embodiment of FIGS. 1–6) or a plug-type float stopper 42 (as included in the embodiment of FIGS. 7–12). The wall 39 of the cavity 38 includes a threadless smooth and generally cylindrical inner surface 44.

The flowmeter body 20 includes a first side wall 45, and a second side wall 47 which is spaced apart and parallel to the first side wall 45. The flowmeter body 20 also includes a passage 43 in communication with the cavity 38 of the receptacle 37. The passage 43 includes an aperture such as a slot 46 extending through the wall 39 of the receptacle 37 that is in communication with the cavity 38. The passage 43 also includes a first channel 49 located on the interior surface of the first side wall 45 and a second channel 51 located on the interior surface of the second side wall 47. The channels 49 and 51 are in communication with the slot 46 and the cavity 38. The channels 49 and 51 are spaced apart and a parallel to one another. The first channel 49 includes a first seat 52 in the form of an elongate slot that extends through the first side wall 45. The second channel 51 includes a second seat 53 in the form of an elongate slot that extends through the second side wall 47. The body 20 also includes an abutment 55 located adjacent the cavity 38 of the receptacle 37. The abutment 55 includes a plurality of generally planar walls 56 located in one-half of a hexagonal configuration. The flowmeter body 20 also includes a mounting assembly 50 best illustrated in FIGS. 5 and 11. The mounting assembly 50 includes threaded apertures 54 to allow for removable mounting of the flowmeter 15 to a surface or to a device by threaded fasteners.

As best shown in FIG. 2, the valve-type float stopper 40 includes a knob 58, a hollow valve body 60 and a valve shaft 62. The valve shaft 62 is threadably received within the valve body 60. The valve body 60 includes a generally cylindrical shank 63 having an annular groove 70 forming a post 71, a threadless generally cylindrical upper surface 66 and a threadless generally cylindrical lower surface 67. The annular groove 70 is located between the upper surface 66 and the lower surface 67. The valve body 60 also includes a hexagonal head 64 attached to the upper end of the shank 63. The head 64 includes a plurality of generally planar walls 67. The valve body 60 also includes a stem 68 attached to the bottom end of the shank 63. The stem 68 includes a plurality of apertures 61 adapted to be placed in communication with the bore 30 and the outlet 34. The shaft 62 is threaded so as to be extendable into the valve body 60 and thereby limit the flow of fluid through the apertures 61 and the outlet 34. The valve body 60 includes an O-ring 65 to seal the stopper 40 with the inner wall 39 of the cavity 38. The hexagonal head 64 is adapted to be seated adjacent to the abutment 55 such that walls 67 of the head 64 are located adjacent and parallel to the walls 56 of the abutment 55. The abutment 55 prevents rotational movement of the head 64 and stopper 40 about the longitudinal axis of the stopper 40 with respect to the valve body 60.

The flowmeter 15 includes a retaining clip member 48. The retaining clip member 48 is generally rectangular in shape and includes a planar top surface 82, a parallel planar bottom surface 83, a first side 84, a second side 86, a first end 88, and a second end 89. The retaining clip member 48 includes a slot 90 at the second end 89 of the clip member 48 extending from the top surface 82 to the bottom surface 83 and extending transverse to the sides 84 and 86. The slot 90 is adapted to receive a small flat blade, such as the tip of a screwdriver, for facilitating sliding of the retainer clip 48. The retaining clip 48 includes a generally semi-circular recess 92 at the first end 88 of the clip member 48. The recess 92 is located between a first leg 85 and a second leg 87 of the clip member 48. The first side 84 of the clip member 48 is adapted to be slidably disposed within the first channel 49 of the first wall 45 of the flowmeter body 20. The second side 86 of the clip member 48 is adapted to be slidably located within the second channel 51 of the second wall 47 of the flowmeter body 20. The clip member 48 is slidable within the channels 49 and 51 between a first position wherein said clip member 48 is located at least partially with the cavity 38 of the body 20 and within the groove 70 of the stopper 40, and a second position wherein the clip member 48 is located completely outside of the groove 70. The recess 92 is adapted to receive the post 71 of the shank 63 formed by the annular groove 70 of the stopper 40 when the clip member 48 is in the first position. The legs 85 and 87 of the clip member 48 are located in the groove 70 of the stopper 40 when the clip member 48 is located in the first position. The clip member 48 is thereby adapted to engage the shank 63 of the stopper 40 when the clip member 48 is in the first position to prevent removal of the stopper 40 from the receptacle 37 of the flowmeter body 20. When the clip member 48 is located in the second position the clip member 48 is located outside of groove 70 and allows removal of the stopper 40 from the receptacle 37 along the longitudinal axis of the stopper 40.

The first side 84 of the clip member 48 includes a first protrusion 94. The second side 86 of the clip member 48 includes a second protrusion 96. The first and second protrusions 94 and 96 are adapted to be respectively received in the first and second seats 52 and 53 of the channels 49 and 51 to thereby inhibit the complete removal of the retaining clip member 48 from the flowmeter body 20, although it may be completely removed if desired. The retaining clip member 48 includes a slot 93 extending from the apex of the recess 92 along the longitudinal axis of the clip member 48 toward the first end 89. The slot 93 allows for the inward compression of the first and second legs 85 and 87 during insertion of the clip member 48 into the passage 43.

Another embodiment of the flowmeter of the present invention is shown in FIGS. 7–12 and is identified with the reference number 150. The flowmeter 150 includes a flowmeter body and a retaining clip member that are constructed in the same manner as the flowmeter body 20 and clip member 48 of the flowmeter 15, and therefore the same reference numbers are used in FIGS. 7–12 to indicate similar elements. The flowmeter 150 includes a plug-type float stopper 42. The float stopper 42 includes a body 154. The body 154 includes a generally cylindrical shank 156 having an annular groove 158 forming a post 160, a threadless generally cylindrical upper surface 162 and a threadless generally cylindrical lower surface 164. The annular groove 158 is located between the upper surface 162 and the lower surface 164. The body 154 also includes a head 168 attached to the upper end of the shank 156. The head 168 includes a plurality of generally planar walls 170 located in one-half of a hexagonal configuration. The head 168 also includes a recess 172 extending horizontally into the head 168. The body 154 also includes a rod 174 attached to the bottom end of the shank 156. The body 60 includes an O-ring 176 to seal the stopper 42 with the inner wall 39 of the cavity 38 of the flowmeter 150. The head 168 is adapted to be seated adjacent to the abutment 55 such that walls 170 of the head 168 are located adjacent and parallel to the walls 56 of the abutment 55. The abutment 55 prevents rotational movement of the head 168 and stopper 42 about the longitudinal axis of the stopper 42 with respect to the valve body 60.

The clip member 48 of the flowmeter 150 is slidable within the channels 49 and 51 of the flowmeter body 20 between a first position wherein the clip member 48 is located at least partially within the cavity 38, and within the groove 158 of the stopper 42, and a second position wherein the clip member 48 is located completely outside of the groove 158. The recess 92 is adapted to receive the post 160 of the shank 156 formed by the annular groove 158 of the stopper 42 when the clip member 48 is in the first position. The legs 85 and 87 of the clip member 48 are located in the groove 158 of the stopper 42 when the clip member 48 is located in the first position. The clip member 48 is thereby adapted to engage the shank 156 of the stopper 42 when the clip member 48 is in the first position and to prevent removal of the stopper 42 from the receptacle 37 of the flowmeter body 20. When the clip member 48 is located in the second position the clip member is located outside of the groove 158 and allows removal of the stopper 42 from the receptacle 37 along the longitudinal axis of the stopper 42. The recess 172 in the head 168 is adapted to receive a small flat blade, such as the tip of a screwdriver, for facilitating the longitudinal removal of the stopper 42 from the receptacle 37. The rod 174 is adapted to prevent the float element 26 from passing through the fluid outlet 34.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A flowmeter for measuring fluid flow, said flowmeter including:
    a body having a fluid inlet, a fluid outlet, a bore in fluid communication with said inlet and said outlet, a receptacle having a cavity formed by a side wall, said cavity being in communication with said bore, and a passage extending through said side wall in communication with said cavity;
    a stopper including a shank having a groove, said shank adapted to be removably inserted into said cavity of said receptacle such that said groove is in communication with said passage of said body; and
    a clip member located in said passage of said body, said clip member being movable between a first position wherein said clip member extends into said cavity of said receptacle and a second position;
    whereby when said clip member is in said first position said clip member is adapted to be located in said groove of said shank of said stopper such that said clip member prevents removal of said stopper from said receptacle, and when said clip member is in said second position said stopper is removable from said receptacle of said body.

2. The flowmeter of claim 1 wherein said side wall of said cavity is threadless, and said shank of said stopper is threadless.

3. The flowmeter of claim 1 wherein said groove in said shank is generally annular.

4. The flowmeter of claim 3 wherein said shank includes a first generally cylindrical surface and a second generally cylindrical surface, said groove being located between said first cylindrical surface and said second cylindrical surface.

5. The flowmeter of claim 1 wherein said stopper includes a head, and said body includes an abutment adapted to engage said head when said stopper is inserted into said cavity of said stopper with respect to said body.

6. The flowmeter of claim 5 wherein said head of said stopper includes a plurality of walls, and said abutment of said body includes a plurality of walls, each said wall of said abutment adapted to be located adjacent a respective wall of said head of said stopper.

7. The flowmeter of claim 1 wherein said passage comprises a slot extending through said side wall of said receptacle and a first channel adapted to receive said clip member, said clip member being slidable in said first channel.

8. The flowmeter of claim 7 wherein said body includes a first wall and a spaced apart second wall, said first channel being located in said first wall of said body, said second wall of said body including a second channel adapted to receive said clip member, said clip member being slidable within said first and second channels.

9. The flowmeter of claim 7 wherein said first side wall includes a seat and said clip member includes a protrusion adapted to be located within said seat.

10. The flowmeter of claim 9 wherein said seat comprises an elongate slot, said protrusion of said clip member being slidable within said seat as said clip member slides within said first channel.

11. The flowmeter of claim 1 wherein said clip member includes a first end and a second end, said first end including a recess adapted to receive said shank of said stopper when said clip member is located in said first position.

12. The flowmeter of claim 11 wherein said clip member includes a first leg and a second leg, said recess being located between said first leg and said second leg, said first leg and said second leg adapted to be located within said groove of said shank of said stopper when said clip member is located in said first position.

13. The flowmeter of claim 11 wherein said second end of said clip member includes an aperture adapted to receive the tip of a tool to facilitate sliding movement of said clip member from said first position to said second position.

14. The flowmeter of claim 1 wherein said clip member includes a generally planar top surface and a generally planar bottom surface located generally parallel to said top surface.

* * * * *